(12) United States Patent
Voigt et al.

(10) Patent No.: US 10,365,840 B2
(45) Date of Patent: Jul. 30, 2019

(54) SYSTEM AND METHOD FOR PROVIDING A SECURE AIRBORNE NETWORK-ATTACHED STORAGE NODE

(71) Applicant: The Boeing Company, Chicago, IL (US)

(72) Inventors: Aaron N. Voigt, Kirkland, WA (US); John M. Hood, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 61 days.

(21) Appl. No.: 15/639,148

(22) Filed: Jun. 30, 2017

(65) Prior Publication Data

US 2019/0004717 A1    Jan. 3, 2019

(51) Int. Cl.
| | |
|---|---|
| *G06F 12/02* | (2006.01) |
| *G06F 3/06* | (2006.01) |
| *G06F 21/55* | (2013.01) |
| *G06F 21/88* | (2013.01) |
| *H04L 29/06* | (2006.01) |

(Continued)

(52) U.S. Cl.
CPC .......... *G06F 3/0622* (2013.01); *G06F 3/0683* (2013.01); *G06F 21/31* (2013.01); *G06F 21/554* (2013.01); *G06F 21/88* (2013.01); *H04L 63/1425* (2013.01); *G06F 12/0246* (2013.01); *G08B 13/1409* (2013.01); *H04L 63/1408* (2013.01)

(58) Field of Classification Search
None
See application file for complete search history.

(56) References Cited

U.S. PATENT DOCUMENTS 9,369,548 B2    6/2016  Voigt et al.
2005/0081060 A1    4/2005  Gancarcik et al.
(Continued)

OTHER PUBLICATIONS

Liszewksi, A., "Self-Destructing SSDs Will Nuke Themselves If You Text Them A Code," Gizmodo, Sep. 30, 2014, retrieved from http://http://gizmodo.com/self-destructing-ssds-will-nuke-themselves-if-you-text-1640733628 on Jun. 19, 2017.

(Continued)

*Primary Examiner* — Brian R Peugh
(74) *Attorney, Agent, or Firm* — Toler Law Group, PC

(57) ABSTRACT

A network-attached storage system and method includes a network-attached storage apparatus and removable storage medium installed in sockets in that apparatus. The storage medium includes an RF receiver and circuitry for erasing or disabling access to memory thereon. A host controller determines when a removable storage medium has been installed in or removed from a socket. A network interface controller is provided for coupling to an external network. An RF transmitter is coupled to a controller. The controller is coupled to each socket via the host controller and to the network interface controller. The controller determines, based on signals from the host controller, when the removal of a removable storage medium from the socket is unauthorized and sends a signal to the RF transmitter for transmission to the RF receiver in the removed removable storage medium to cause the memory therein to be erased or access thereto to be disabled.

20 Claims, 3 Drawing Sheets

(51) Int. Cl.
*G06F 21/31* (2013.01)
*G08B 13/14* (2006.01)

(56) References Cited

U.S. PATENT DOCUMENTS

| | | | | |
|---|---|---|---|---|
| 2007/0210162 A1* | 9/2007 | Keen | ................. | G06K 19/0723 |
| | | | | 235/451 |
| 2012/0151121 A1* | 6/2012 | Braga | .................... | G06F 21/79 |
| | | | | 711/103 |
| 2013/0159613 A1* | 6/2013 | Luukkainen | ........ | G06F 12/0246 |
| | | | | 711/103 |
| 2014/0115205 A1* | 4/2014 | Jin | ...................... | G06F 13/4022 |
| | | | | 710/74 |
| 2015/0199547 A1* | 7/2015 | Fraccaroli | .............. | G06Q 10/10 |
| | | | | 340/10.1 |
| 2016/0209890 A1 | 7/2016 | Rose et al. | | |
| 2016/0300088 A1* | 10/2016 | Wang | .................. | H04B 5/0031 |

OTHER PUBLICATIONS

Communication Pursuant to Article 94(3) EPC, dated Apr. 3, 2019 in corresponding EP18168066.1, 7 pgs.

* cited by examiner

SYSTEM AND METHOD FOR PROVIDING A SECURE AIRBORNE NETWORK-ATTACHED STORAGE NODE

FIELD

This disclosure relates generally to a system and method for providing a secure airborne network-attached storage node.

BACKGROUND

Current airborne network-attached storage (NAS) solutions use large expensive 2.5" Solid State Drives (SSD) as the replaceable storage medium. The use of an SSD in a network-attached storage solution presents a number of challenges in an aircraft environment including a significant power draw, a large form-factor, and an electrical interface for connection to the host computer that is not easily connected/disconnected.

Accordingly, there is a need for a system and method which overcomes the problems recited above.

SUMMARY

In a first aspect, a network-attached storage system has at least one removable storage medium. The at least one removable storage medium includes a radio-frequency (RF) receiver and memory for storage and associated circuitry for erasing or disabling access to the memory upon receipt of an appropriate signal via the RF receiver. At least one socket receives a respective one of the at least one removable storage medium associated with the socket. At least one host controller is coupled to a respective one of the at least one sockets. Each of the at least one host controllers determines when the respective one of the at least one removable storage medium has been installed in or removed from the respective socket. A network interface controller couples the network-attached storage system to an external network. An RF transmitter is coupled to a controller. The controller is coupled to each of the at least one sockets via the respective one of the at least one host controllers and to the network interface controller. The controller reads information from and writes information to the removable storage medium when installed in the socket in response to read and write commands received via the network interface controller. The controller provides responses via the network interface controller to the received commands based on the information read from or written to the removable storage medium. The controller receives signals from each of the at least one host controllers indicating when the respective one of the at least one removable storage medium has been has been installed in or removed from the respective socket. The controller determines, when one of the at least one removable storage medium has been removed from the respective socket, that the removal was unauthorized and the controller sends a signal to the RF transmitter for transmission to the RF receiver in the removed one of the at least one removable storage medium to cause the memory in the removed of the at least one removable storage medium to be erased or cause access to the removed one of the at least one removable storage medium to be disabled.

In a further embodiment, the at least one removable storage medium may be a memory card. The memory card may be a Secure Digital (SD) card. Still further, each of the at least one host controllers may each be an SD card host controller.

In another further embodiment, the network-attached storage system may have a keypad coupled to the controller, and the controller may determine that the removal of the at least one removable storage medium from the associated socket was unauthorized by determining that the at least one removable storage medium was removed from the associated socket without entry of a predetermined security code on the keypad.

In yet another further embodiment, the network-attached storage system may have a keypad coupled to the controller, an access door arranged to cover the socket and to cover the installed removable storage medium when the access door is closed and to provide access thereto when opened, and a sensor coupled to the controller for determining when the access door is opened. In this embodiment, the controller may generate a signal transmitted to each of the at least one removable storage medium to cause the memory therein to be erased or access thereto to be disabled when the access door is opened without any entry of a predetermined security code on the keypad.

In a still further embodiment, the network-attached storage system may have a keypad coupled to the controller. In this embodiment, the controller may securely erase memory in all of the at least one removable storage medium when a user enters an incorrect security code on the keypad a predetermined number of times.

In another further embodiment, the network-attached storage system has a display coupled to the controller for providing status or command information to a user.

In a second aspect, a network-attached storage system has at least one removable storage medium. The at least one removable storage medium includes a radio-frequency (RF) receiver and memory for storage and associated circuitry for erasing or disabling access to the memory upon receipt of an appropriate signal via the RF receiver. At least one socket receives a respective one of the at least one removable storage medium associated with the socket. A host controller is coupled to each of the at least one sockets. The host controller determines when the respective one of the at least one removable storage medium has been installed in or removed from the respective socket. A network interface controller couples the network-attached storage system to an external network. An RF transmitter is coupled to a controller. The controller is coupled to each of the at least one sockets via the host controller and to the network interface controller. The controller reads information from and writes information to the removable storage medium when installed in the socket in response to read and write commands received via the network interface controller. The controller provides responses via the network interface controller to the received commands based on the information read from or written to the removable storage medium. The controller receives signals from each of the at least one host controllers indicating when the associated one of the at least one removable storage medium has been has been installed in or removed from the respective socket. The controller determines, when one of the at least one removable storage medium has been has been removed from the respective socket, that the removal was unauthorized and the controller sends a signal to the RF transmitter for transmission to the RF receiver in the removed one of the at least one removable storage medium to cause the memory in the removed one of the at least one removable storage medium to be erased or cause access to the removed one of the at least one removable storage medium to be disabled.

In a further embodiment, the at least one removable storage medium may be a Universal Serial Bus (USB) flash drive and the host controller may be a USB hub.

In a third aspect, a method for operating a network-attached storage system first installs a plurality of removable storage medium into associated sockets provided in the network-attached storage system. Next, the memory in the removable storage medium is formatted. Then, responses are provided commands received from one or more clients coupled to the network-attached storage system for reading information from or writing information to the formatted memory. The status of each of the plurality of removable storage medium is monitored. The removal of one or more of the plurality of removable storage medium from the associated socket is detected. It is then determined that the removal of the one or more of the plurality of removable storage medium from the associated socket was unauthorized. Finally, a signal is generated that is transmitted to each of the removed one or more of the plurality of removable storage medium to cause the memory therein to be erased or access thereto to be disabled.

In one further embodiment, the status of a keypad provided on the network-attached storage system is monitored and the determination that the removal of the one or more of the plurality of removable storage medium from the associated socket was unauthorized is performed by determining that the one or more of the plurality of removable storage medium was removed from the associated socket without entry of a predetermined security code on the keypad.

In another further embodiment, the status of a keypad provided on the network-attached storage system is monitored and the status of an access door provided on the network-attached storage system over the associated sockets is monitored. A signal is generated that is transmitted to each of the plurality of removable storage medium to cause the memory therein to be erased or access thereto to be disabled when the access door is opened without any entry of a predetermined security code on the keypad.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Commercial aircraft often have a need to store certain sensitive information, e.g., root-level certificates, on a network-attached storage device. A removable storage medium is preferred for such devices, allowing the sensitive information to be easily updated by replacing the existing storage medium with a new storage medium including the updated information. The airborne network-attached storage node system and method provides a network-attached storage device suitable for use on an aircraft that uses removable medium in the form of removable flash-based memory cards, such as a Secure Digital (SD) Card. Although SD Cards have become the most commonly used memory card and the present disclosure describes a system and method having SD Cards as the removable storage medium, any type of removable memory card may be used in alternative embodiments. In addition, in another alternative embodiment, a USB flash drive may be used as the removable storage medium, instead of a flash memory card. Still further, the memory card (or USB flash drive) selected may include a radio-frequency (RF) receiver and associated circuitry that allows the memory card (or USB flash drive) to automatically erase itself (or otherwise render the memory unreadable) upon receipt of an RF signal from a remote RF transmitter.

Figure 1:
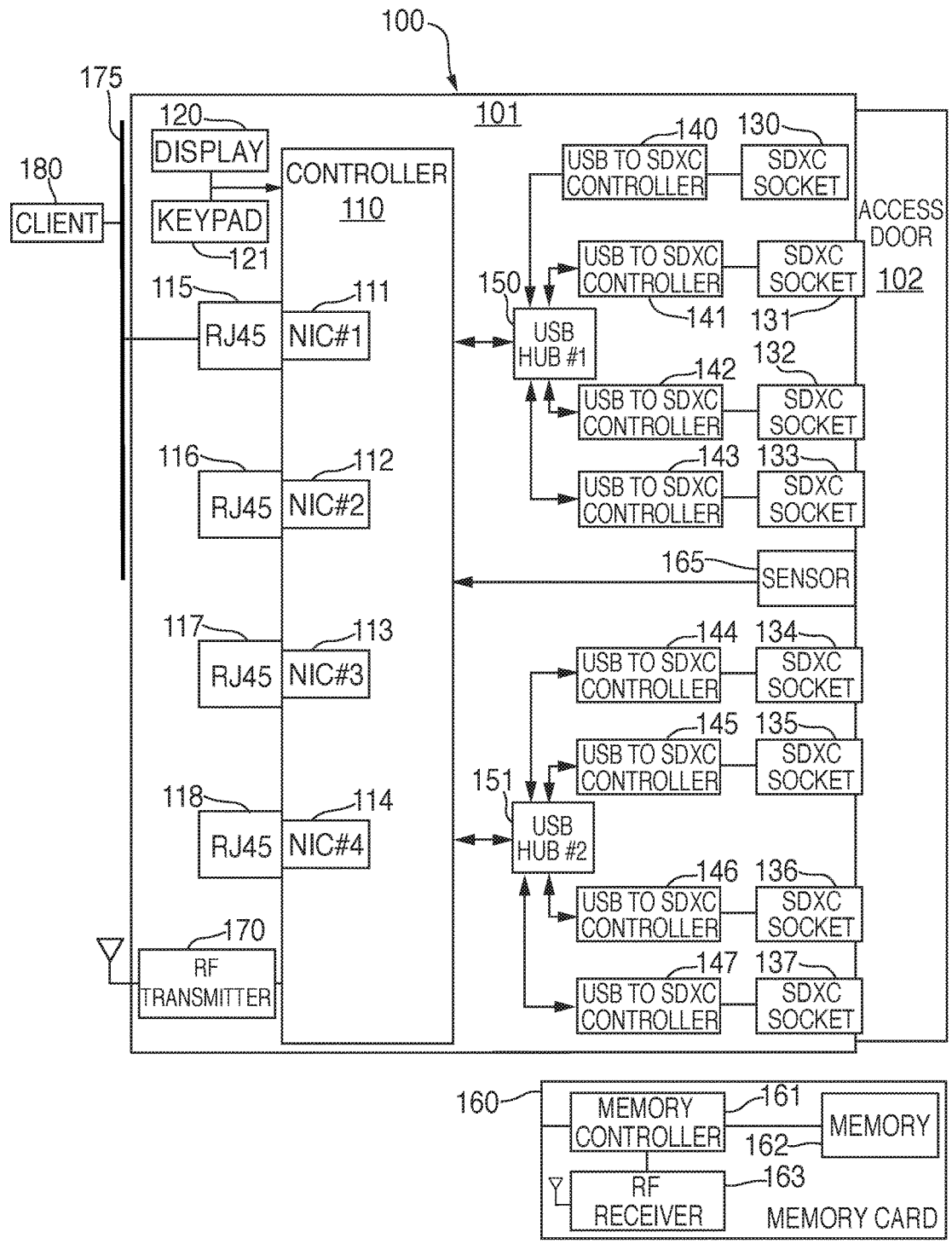
FIG. 1 is a schematic representation of an airborne network-attached storage node system according to an embodiment of the present disclosure.

Referring now to FIG. 1, a network-attached storage system 100 is shown in schematic diagram format and includes a network-attached storage apparatus 101 and one or more memory cards 160. Network-attached storage apparatus 101 includes a controller 110 that is coupled to four network interface controllers (NICs) 111, 112, 113, 114. Although four NICs are shown in FIG. 1, that number is arbitrary and depends on the particular application. The minimum number of NICs is one and there can be more than four NICs if desired. Each NIC 111, 112, 113, 114 is coupled to a separate associated network jack 115, 116, 117, 118. Each network jack 115, 116, 117, 118 is preferably a Registered Jack 45 (RJ-45) Ethernet jack but may be other types of jacks when a different type of network is in use. In operation, NIC 111 may be coupled to a client 180 via an aircraft network 175, for example. Controller 110 is also coupled to a display 120 and a keypad 121. Display 120 and keypad 121 are optional and may be used to obtain certain status information relating to, for example, the removable medium, and to provide command data to a user (i.e., when to insert or remove a particular memory card). Network-attached storage apparatus 101 includes eight sockets 130-137. Each of the sockets 130-137 is for receiving and coupling an associated memory card to an associated host controller 140-147. An access door 102 may be provided to cover sockets 130-137 after the memory cards are installed therein. Host controllers 140-143 are coupled to controller 110 via a first USB hub 150 and host controllers 144 to 147 are coupled to controller 110 via a second USB hub 151. Each of the host controllers 140-147 may also be coupled to controller 110 via certain separate protect lines as known in the art. An RF transmitter 170 may also be coupled to controller 110. RF transmitter 170 is for communicating with an RF receiver 163 optionally included in the memory cards selected for use with network-attached storage apparatus 101. As shown in FIG. 1, a memory card 160 typically includes a memory controller 161 coupled to a memory 162. RF receiver 163 may be added to memory card 160. In particular, controller 110 may be configured to detect any unauthorized removal of the memory cards installed in sockets 130-137 and to then transmit a signal via RF transmitter 170 to the RF receiver 163 on the removed memory card (or cards) to cause the memory card (or cards) to automatically erase all information included thereon (or take any other action which would render that memory card unreadable). This is performed by, for example, by the memory controller 161 on the memory card 160. For example, a security code may be required (entered via keypad 121) to remove the memory cards. When a memory card is removed without entering this security code, controller 110 automatically sends a signal (via RF transmitter 170) that causes the removed memory card to be erased or access to the memory therein to be disabled. This provides an added level of security for the information stored on the memory cards. In another further embodiment, a sensor 165 is coupled to controller 110 that determines when access door 102 has been opened. Controller 110 may further be configured to monitor the status of access door 102 (e.g., via the state of sensor 165) and to transmit a signal causing the memory on all of the memory cards to be erased or access thereto to be disabled when the access door 102 is opened without entry of a predetermined security code on the keypad.

In FIG. 1, each of the sockets 130-137 is for receiving a Secure Digital Extended Capacity (SDXC) Card and each host controller 140-147 is a USB to SDXC controller (i.e., one type of SD card host controller). In alternative embodiments, host controllers 140-147 may be coupled to controller 110 via a bus topology other than USB, e.g., a bus according to the Peripheral Component Interconnect Express (PCIe) standard. Further, as discussed above, other types of memory cards may be selected for use as the storage medium instead of an SD Card, and sockets 130-136 are chosen to accept the particular type of memory card selected. Likewise, host controllers 140-147 are also chosen to match the particular type of memory card selected. Finally, in the event that USB memory sticks are selected for use as the memory storage medium, sockets 130-137 will be USB sockets and the host controllers 140-147 may be omitted, with sockets 130-137 coupled directly to the associated USB hub 150 or 151.

In operation, controller 110 is preferably a controller that provides the management interface to the both the memory array and an external network server. In particular, controller 110 manages the storage capacity provided by the memory cards installed in sockets 130-137, including establishing a redundant array of independent disks (RAID) configuration among the memory provided on these memory cards. In addition, controller 110 receives processes memory read and write requests via any one of the NICs 111-114. Controller 110 may also encrypt (for data to be written) and decrypt (for data to be read) the data to be stored on or read from, respectively, the memory on the memory cards. Network-attached storage apparatus 101 is preferably coupled via a network (via one or more of NICs 111-114) to an airborne server (not shown) in a secure manner, e.g., using security keys. Controller 110 may also be configured to securely erase (e.g., repeatedly overwrite) the information stored in memory whenever a user repeatedly incorrectly enters a security code on keypad 121 in an effort to remove the memory cards.

Figure 2:
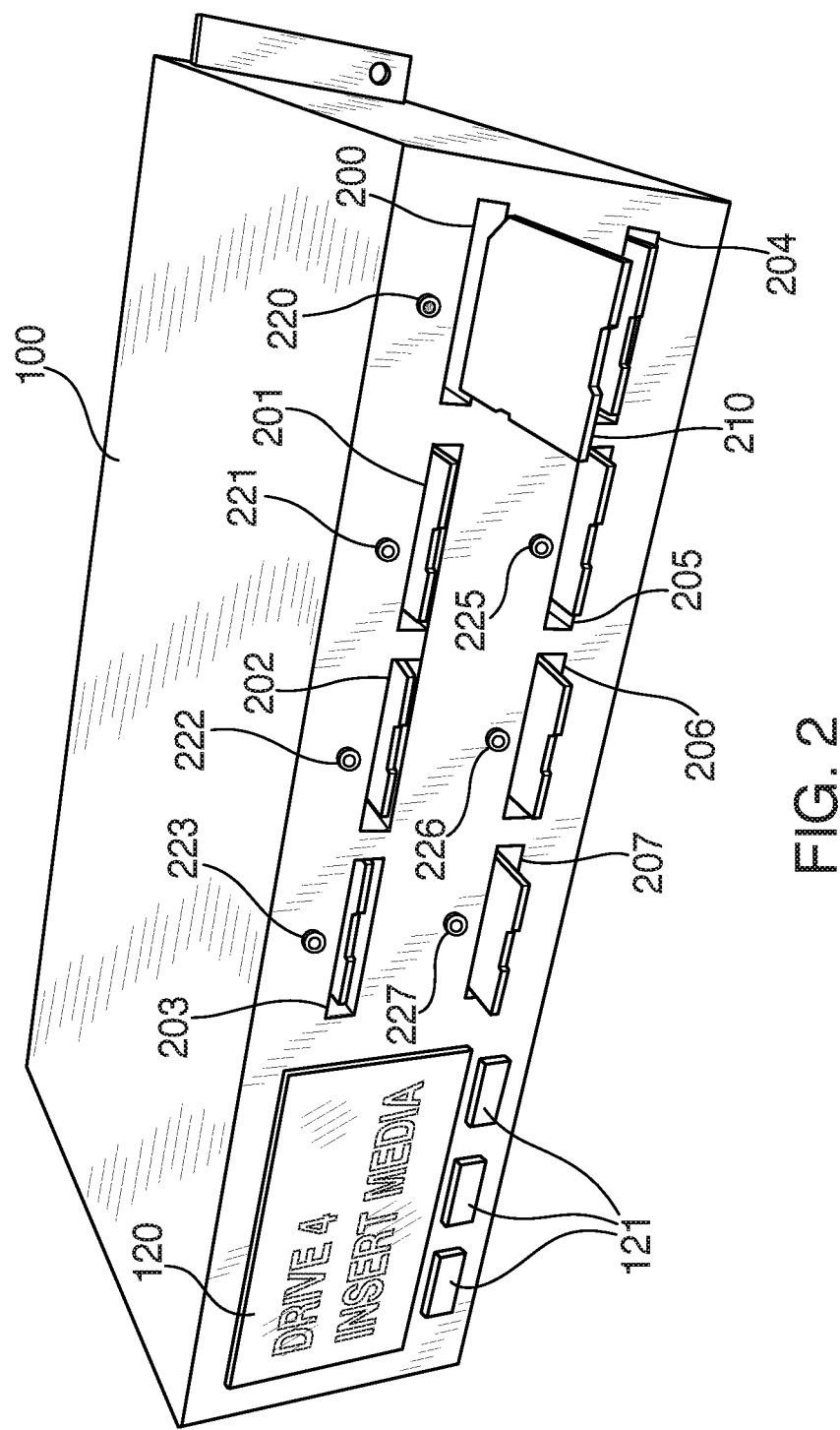
FIG. 2 is a diagram an airborne network-attached storage node system according to an embodiment of the present disclosure.

Referring now to FIG. 2, network-attached storage apparatus 101 is shown with slots 200-207 for receiving SD Cards. An SD Card 210 is shown being inserted into slot 200 and SD Cards are shown already installed in respective slots 201-207. Each slot 200-207 may have an associated indicator light 220-227 positioned nearby. Each of the slots 200-207 provides access to an associated memory card socket, i.e., sockets 130-137 in FIG. 1. Each indicator light 220-227 indicates when a memory card is present and in good working order in the associated slot 200-207. In a further embodiment, the indicator lights 220-227 may each have different colors, with the additional colors used to identify if the associated memory card has failed or if there is a security issue with the memory card. Network-attached storage apparatus 101 preferably also includes a display 120 and a keypad 121. As discussed above, display 120 and keypad 121 are used to obtain status information and commands for the user.

Figure 3:
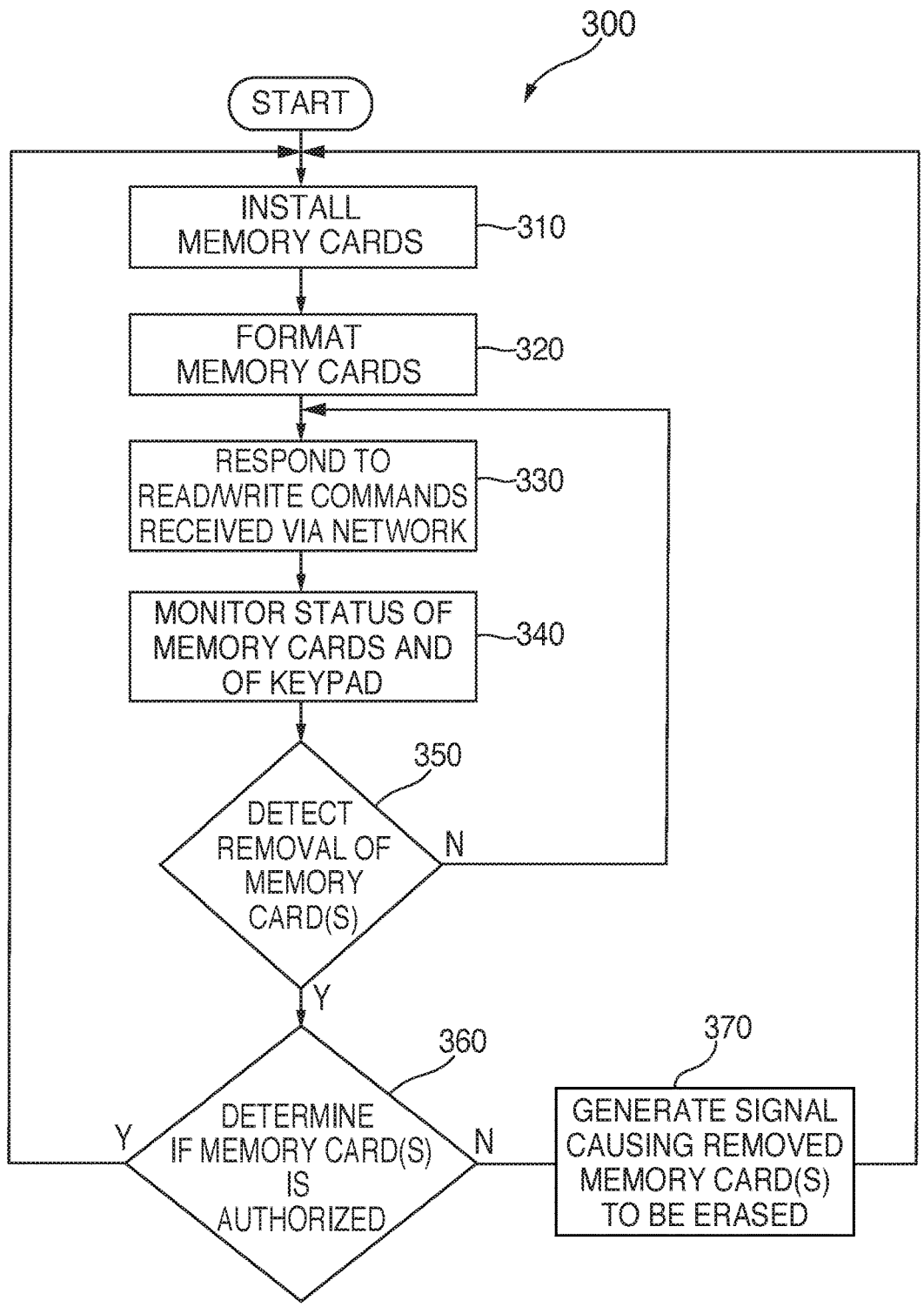
FIG. 3 is a flowchart of an airborne network-attached storage node method according to an embodiment of the present disclosure.

Referring now to the flowchart 300 in FIG. 3, at an initial step 310, the memory cards (or USB flash drives) are installed in the appropriate slots in network-attached storage apparatus 101 shown in FIGS. 1 and 2. Next, at step 320 the controller 110 (FIG. 1) detects when the memory cards (or USB flash drives) are installed, either automatically or via commands entered via keypad 121, and formats the memory, e.g., into a RAID format, for use as a network-attached storage device. Once the memory on the memory cards (or USB flash drives) is formatted, at step 330 controller 110 receives and responds to read and/or write commands (and other NAS commands) received from clients 180 coupled to network-attached storage apparatus 101 via the aircraft network 175 and one of the NICs 111-114. As discussed above, controller 110 may implement encryption/decryption in reading and writing the information to or from the memory. Controller 110 also monitors the status of the memory cards (or USB flash drives) and the keypad 121, step 340, and determines, at step 350, if any memory cards (or USB flash drives) have been removed. If no memory card (or USB flash drive) has been removed, processing reverts up to step 330. If one or more memory cards (or USB flash drives) have been removed, controller 110 then determines, at step 360, if such removal was authorized (e.g., if removal was preceded by entry of a defined security code on keypad 121). If the removal was authorized, processing proceeds back to step 310 to await replacement of the removed one or more memory cards (or USB flash drives). If the removal was not authorized, processing proceeds to step 370, where controller 110 generates a signal that is transmitted to the removed one or more memory cards (or USB flash drives) via RF transmitter 170 that causes the removed one or more memory cards (or USB flash drives) to be erased (or otherwise rendered unusable and unreadable). Once step 370 is complete, processing proceeds to step 310 to await replacement of the removed one or more memory cards (or USB flash drives).

Network-attached storage system 100 provides a secure storage solution in a small package by using the small form factor of flash memory cards for the storage medium, thereby reducing development costs and providing a ruggedized storage medium. In addition, the use of an industry standard storage medium (e.g., SD Cards) improves both current and future storage density options as technology advances. In particular, the storage capacity provided by network-attached storage system 100 is linked directly to the current state of art of memory card (or USB flash drive) storage capacity, and the potential storage density of network-attached storage system 100 will increase linearly with increases in the storage density in that art.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system comprising:
a storage medium including:
 a radio-frequency (RF) receiver;
 a memory configured to store data; and
 access circuitry configured to make the data inaccessible upon receipt of a particular signal via the RF receiver; and
a memory reader comprising:
 a socket configured to receive the storage medium;
 a host controller coupled to the socket, wherein the host controller is configured to determine whether the storage medium has been installed in or removed from the socket;
 a network interface controller configured to couple to an external network;
 an RF transmitter; and
 a controller coupled to the socket via the host controller, the controller coupled to the network interface controller, the controller configured to, in response to commands received from the network interface controller, access the data while the storage medium is installed in the socket, the controller configured to provide responses via the network interface controller based on the data, wherein the controller is configured to receive an indication from the host controller indicating that the storage medium has been has been installed in or removed from the socket, wherein the controller is configured to, responsive to the storage medium being removed, determine whether removal of the storage medium was authorized, and wherein the controller is configured to, responsive to removal of the storage medium being unauthorized, send the particular signal to the RF transmitter for transmission to the RF receiver to cause the access circuitry to make the data inaccessible.

2. The system of claim 1, wherein the storage medium includes a memory card.

3. The system of claim 2, wherein the memory card includes a Secure Digital (SD) card.

4. The system of claim 3, wherein the host controller includes an SD card host controller.

5. The system of claim 1, wherein the memory reader further includes a keypad coupled to the controller, and wherein the controller determines that removal of the storage medium from the socket was unauthorized in response to the storage medium being removed from the socket without entry of a particular security code on the keypad.

6. The system of claim 1, wherein the memory reader further includes:
a keypad coupled to the controller;
an access door configured to cover the socket and the storage medium while the access door is in a first position, wherein the access door is configured to provide access to the socket and the storage medium while the access door is in a second position;
a sensor coupled to the controller, the sensor configured to determine whether the access door is in the second position, wherein removal of the storage medium is unauthorized responsive to the storage medium being removed after the access door is moved to the second position from the first position without entry of a particular security code on the keypad.

7. The system of claim 1, wherein the memory reader further includes a keypad coupled to the controller, wherein the controller is configured to securely erase the data responsive to entry of an incorrect security code on the keypad a particular number of times.

8. The system of claim 1, wherein the access circuitry is configured to make the data inaccessible by disabling access to the memory.

9. The system of claim 1, wherein the access circuitry is configured to make the data inaccessible by deleting the data.

10. A system comprising:
a storage medium including:
 a radio-frequency (RF) receiver;
 a memory configured to store data; and
 access circuitry configured to make the data inaccessible upon receipt of a particular signal via the RF receiver; and
a memory reader comprising:
 a plurality of sockets, wherein a first socket of the plurality of sockets is configured to receive the storage medium;
 a host controller coupled to each socket of the plurality of sockets, wherein the host controller is configured to determine whether the storage medium has been installed in or removed from the first socket;
 a network interface controller configured to couple to an external network;
 an RF transmitter; and
 a controller coupled to each socket of the plurality of sockets via the host controller, the controller coupled to the network interface controller, the controller configured to, in response to commands received from the network interface controller, access the data while the storage medium is installed in the socket, the controller configured to provide responses via the network interface controller based on the data, wherein the controller is configured to receive an indication the host controller indicating that the storage medium has been has been installed in or removed from the first socket, wherein the controller is configured to, responsive to the storage medium being removed, determine whether removal of the storage medium was authorized, and wherein and the controller is configured to, responsive to removal of the storage medium being unauthorized, send the particular signal to the RF transmitter for transmission to the RF receiver to cause the access circuitry to make the data inaccessible.

11. The system of claim 10, wherein the storage medium includes a USB flash drive.

12. The system of claim 11, wherein the host controller includes a USB hub.

13. The system of claim 10, wherein the memory reader further includes a keypad coupled to the controller, and wherein the controller determines that removal of the storage medium from the socket was unauthorized in response to the storage medium being removed from the socket without entry of a particular security code on the keypad.

14. The system of claim 10, wherein the memory reader further includes:
a keypad coupled to the controller;
an access door configured to cover the socket and the storage medium while the access door is in a first position, wherein the access door is configured to provide access to the socket and the storage medium while the access door is in a second position;
a sensor coupled to the controller, the sensor configured to determine whether the access door is in the second position, wherein removal of the storage medium is unauthorized responsive to the storage medium being removed after the access door is moved to the second position from the first position without entry of a particular security code on the keypad.

15. The system of claim 10, wherein the memory reader further includes a keypad coupled to the controller, wherein the controller is configured to securely erase the data responsive to entry of an incorrect security code on the keypad a particular number of times.

16. The system of claim 10, wherein the memory reader further includes a display coupled to the controller, wherein the display is configured to provide status information to a user.

17. The system of claim 10, wherein the memory reader further includes a display coupled to the controller, wherein the display is configured to provide command information to a user.

18. A method comprising:
accessing data stored in a memory of a storage medium based on commands received from a network interface controller of a memory reader, the storage medium installed in a socket of the memory reader;
detecting removal of the storage medium from the socket;
determining whether removal of the storage medium from the socket was authorized;
in response to removal of the storage medium being unauthorized, generating a particular signal; and
initiating transmission of the particular signal to the storage medium, wherein receiving the particular signal causes access circuitry of the storage medium to make the data inaccessible.

19. The method of claim 18, wherein the determination that removal of the storage medium from the socket was unauthorized is in response to the storage medium being removed from the socket without entry of a particular security code on a keypad coupled to the memory reader.

20. The method of claim 18, wherein removal of the storage medium is unauthorized responsive to the storage medium being removed after an access door associated with the socket is opened without entry of a particular security code on a keypad coupled to the memory reader.

* * * * *